United States Patent [19]

Erkfritz

[11] 3,709,625
[45] Jan. 9, 1973

[54] CUTTING TOOTH MOUNTING FOR COARSE AND FINE ADJUSTMENT

[75] Inventor: Donald S. Erkfritz, Rockford, Ill.

[73] Assignee: The Ingersoll Milling Machine Company, Rockford, Ill.

[22] Filed: June 4, 1971

[21] Appl. No.: 149,898

[52] U.S. Cl. .................................. 408/181, 408/153
[51] Int. Cl. ........................................... B23b 29/034
[58] Field of Search ....... 408/153, 181, 198, 154, 155

[56] References Cited

UNITED STATES PATENTS 2,913,935  11/1959  Flannery et al. ...................... 408/198
3,073,186  1/1963   Flannery ............................... 408/181
3,178,969  4/1965   Yogus et al. .......................... 408/154
3,518,738  7/1970   Porter ................................. 408/153 X Primary Examiner—Andrew R. Juhasz
Assistant Examiner—Z. R. Bilinsky
Attorney—Wolfe, Hubbard, Leydig, Voit & Osann

[57] ABSTRACT

This is an improvement over the cutting tooth mounting shown in Lemery et al. application Ser. No. 802,863 now abandoned in that the internal thread mating with the coarse thread of the differential screw is formed in a nut journaled in the cutter body and held against axial shifting.

8 Claims, 5 Drawing Figures

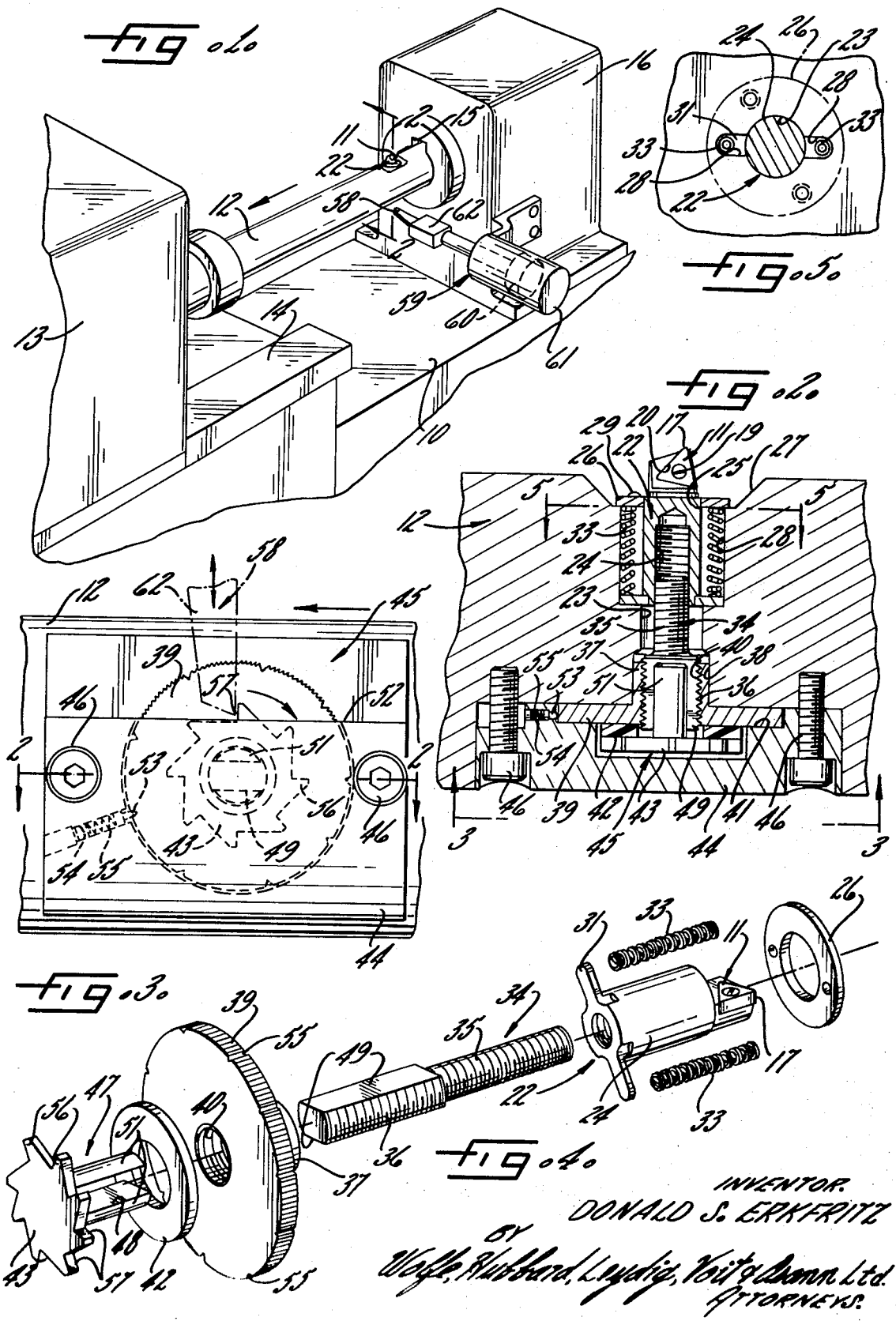

ial for extracting. The invention is shown in the drawings incorporated in a machine of the type commonly used for finish boring holes in a workpiece secured to and located accurately in a fixture on a bed structure 10, an example of such machine being disclosed in U.S. Pat. No. 3,457,811. The boring is effected by the tip 17 of a short tooth 11 projecting radially from a tool spindle or shaft 12 supported cantilever fashion by a conventional rotary spindle on a head 13 which is slidable back and forth along ways 14 formed on the machine bed. During a boring cycle, the spindle, while accurately positioned angularly, is rapidly advanced endwise to move the cutting tooth into and along a slot 15 in a bearing structure 16, enlargement of the work bore being effected while the bar is being rotated and fed forwardly to advance the rotating tooth through the work bore. After the boring, rotation of the spindle is interrupted with the tooth 11 alined with the slot 15 (FIG. 1), and the head 13 is retracted rapidly, as indicated by the arrows, to the starting position.

CUTTING TOOTH MOUNTING FOR COARSE AND FINE ADJUSTMENT

BACKGROUND OF THE INVENTION

This invention relates to the mounting of a cutter tooth for both fine and coarse outward adjustment through the use of a screw disposed within a hole in the cutter body and having fine and coarse threads at opposite ends, one mating with a slidable nut carrying the cutting tooth for use in effecting the fine adjustment and the other thread mating with a nut independently rotatable to effect coarse adjustment of the tooth. A mounting of this general character is disclosed in U.S. Pat. No. 2,125,005.

SUMMARY OF THE INVENTION

The present invention aims to provide for independent fine and coarse adjustments of the cutting tooth in a mounting of the above character by mating one thread of the differential screw into a nut which is journaled in the tool body while being held against axial shifting. Turning of this nut for coarse adjustment of the tooth is effected manually through the medium of a disk exposed on the exterior of the boring bar and disposed between the latter and a smaller disk which is turned step by step as in the Lemery et al. construction to effect the fine adjustment.

BRIEF DESCRIPTION OF THE DRAWINGS

FIG. 1 is a fragmentary and somewhat schematic plan view of a boring machine embodying the novel features of the present invention.

FIG. 2 is a section taken along the lines 2—2 of FIGS. 1 and 3.

FIG. 3 is an elevational view taken along the line 3—3 of FIG. 2.

FIG. 4 is a fragmentary perspective view.

FIG. 5 is a fragmentary cross-section along the line 5—5 of FIG. 2.

DESCRIPTION OF THE PREFERRED EMBODIMENT

Herein, the tooth 11 is an indexable wafer of cutting material seated in and secured by a screw actuated clamp 19 in a socket 20 on the outer end portion of a holder 22 which is disposed in a hole 23 extending transaxially through the spindle 12. The cylindrical intermediate portion 24 of the holder is slidable through and guided accurately in the hole 23 which terminates at the bottom of a recess 27 in the side of the spindle. Keys 31 projecting from diametrically opposed sides of the holder at the inner end thereof fit slidably in longitudinal grooves 28 (FIG. 5) formed in and extending along the hole 23. The holder is thus held against turning. Coiled springs 33 disposed in the grooves act in compression between the lugs 31 and a retainer plate 26 secured by screws 29 against the bottom of the recess 27. The holder is continuously urged endwise and inwardly thus taking up backlash between the mating threads of the screw, the holder and the spindle so that the position of the cutting tip 17 is fixed precisely relative to the cutter body without the necessity of clamping the holder to the body.

Outward adjustment of the tooth holder 22 in fine increments and coarse manual adjustment of the holder as contemplated by the present invention are effected through a differential screw 34 disposed within the hole 23 and having threads 35 and 36 of the same hand, right in the present instance, but of slightly different pitches formed on opposite end portions. In this instance, the thread 35 of lesser pitch extends into and mates with the internal thread of the holder or nut 22. The thread 36 of greater pitch extends through and mates with the internal thread 40 of a nut 37 which is journaled at 38 in the end of the hole 23 opposite the tooth 11. Herein, this nut comprises a tubular hub on a disk 39 which, by the springs 33 and through the medium of the mating screw threads, is held in abutment with the inner surface 41 a cover plate 44. Bearing loosely against the opposite side of a washer 42 is a toothed wheel 43 which is spline coupled to the adjacent end portion of the differential screw and positioned axially by the plate 44 which is disposed in a recess 45 on the side of the boring bar opposite the recess 27 and clamped against the bottom of the recess by screws 46.

Spline coupling of the toothed disk 43 to the screw 36 is effected herein through the projections 47 rigid with and projecting inwardly from the disk and having opposed flat sides 48 which extend along and in sliding contact with parallel flats 49 on opposite sides of the screw thread 36. The outer surfaces 51 of the projections are cylindrical and journaled in the minor diameter of the thread 40, an end portion of which is flattened somewhat to provide a bearing for the projections 47 and thus support the toothed wheel 43 in alinement with the screw.

It will be apparent that the disks 39 and 43 are supported in axially fixed planes and are adapted for independent rotation either to turn the nut 37 alone relative to the screws 35, 36 by turning the disk 39 or to turn both screws by turning the disk 43 and both of the screws relative to their mating nuts. Thus, coarse endwise adjustment of the tooth 11 may be effected by turning the disk 39 while fine adjustment of the tooth by the differential action of the screws 35 and 36 is effected in response to turning of the toothed wheel 43. Part of the periphery of each disk projects beyond the edge 52 of the cover plate so as to be accessible for turning either automatically or manually. Herein, automatic and fine adjustments are effected through the disk 43 while the disk 39 is adapted to be turned manually when it is desired to make relatively large adjustments of the tooth as in setting the tooth for a new boring operation. For this latter purpose, the disk 39 is preferably made considerably larger in diameter than the disk 43 and its peripheral edge is preferably knurled as shown in FIG. 4 to facilitate finger gripping or to cooperate with a yieldable detent 53 in holding each adjusted position of the disk. The detent is slidable in a hole 54 in the plate and is urged by a spring 55 against the disk periphery. If desired, the holding force may be increased substantially and gaging of the extent of each coarse adjustment can be facilitated by forming notches 55 in the disk angularly spaced equidistantly around the knurled periphery thereof.

Step by step indexing of the disk 43 may be effected automatically during the axial shifting of the boring bar 12 in the course of an automatically executed cycle of the boring machine. For example, as disclosed in the aforesaid patent, this may be accomplished by making the disk 43 in the form of a star wheel having radially projecting teeth 56 with surfaces 57 disposed in radial planes and of uniform angular pitch corresponding to the turning of the disk required to produce the desired increment of outward adjustment of the cutting tooth in each indexing step. In all indexed positions of the disk, at least one tooth projects beyond the edge 52 of the plate as shown in FIG. 3. This tooth is thus exposed for engagement by a stop or pawl 58 which is mounted on the boring machine for back and forth movement transversely of the boring bar between a retracted and inactive position shown in FIG. 1 and an active or blocking position shown in phantom in FIG. 3. Such movements are effected by a reversible actuator 59 may include a piston 60 slidable in a cylinder 61 fixed to the machine frame. Herein, the stop comprises the free end of a bar constituting an extension of the piston rod and slidable in a guide 62 holding the stop in the plane of the star wheel which is disposed on the underside of the boring bar with the face 57 of the exposed tooth 56 positioned for engagement with the stop and to be blocked thereby during retraction of the boring bar in the direction indicated by the arrow in FIG. 3. After such engagement, the retracting motion of the bar is utilized to turn the wheel clockwise until the end of the tooth rides off from the stop after turning through an angle predetermined by the pitch and lengths of the wheel teeth.

Under the control of suitable mechanism disclosed in the aforesaid application, the stop may be advanced and retracted by the admission of pressure fluid to the head and rod ends of the cylinder 61 at proper times in the cycle of the boring machine. In this instance, the cutting tooth adjustment is effected during retraction of the boring bar, the stop being projected into active position before the star wheel reaches this position and retracted before the advance of the boring bar in the next machine cycle.

Assuming the pitch of the thread 35 to be 0.049 per inch and that of the coarse thread 36 to 0.050 per inch, both threads being right hand, the tooth 11 will be set out 0.001 of an inch in each revolution of the disk 43 and a proportionately smaller increment in each step of turning thereof as determined by the angular spacing of the teeth 56.

For the coarse adjustment, the tooth 11 will be set outwardly 0.050 of an inch in each revolution of clockwise turning of the disk 39. The extent of such adjustment may easily be gaged by sensing the number of the notches 55 passing the detent 53. If it is desired to retract the tooth 11 inwardly, it is only necessary to turn the disk 39 counterclockwise so as to thread the nut 37 farther onto the screw thread 36 and thus draw the screw and the tooth holder 24 inwardly relative to the boring spindle.

I claim:

1. A cutting tool having, in combination, a body having a hole extending therethrough, an elongated screw disposed within and extending axially along said hole and having a thread of fine pitch along one end portion and a thread of greater pitch along the opposite end portion, a nut disposed in and slidable endwise along an end portion of said hole and threaded onto a first one of said threads, a cutting tooth fixed to said nut and having a tip projecting from said body and the end of said hole, a second nut journaled in the opposite end portion of said hole and threaded onto the second thread, means holding said first nut against turning and said second nut against endwise movement, a member on said second nut having a surface exposed exteriorly of said body for turning of the nut independently of said screw to effect endwise adjustment of said tooth, a second member spline coupled to the second thread end portion of said screw and having a surface exposed exteriorly of said body for turning of the member independently of said first member to effect fine endwise adjustment of said tooth, and means holding said members substantially in axially fixed planes while permitting free and independent turning thereof.

2. A cutting tool as defined in claim 1 in which said first and second members are disks disposed adjacent each other and rotatable in axially fixed planes.

3. A cutting tool as defined in claim 2 in which the disk constituting said first member is of larger diameter than the other disk.

4. A cutting tool as defined in claim 3 including detent means engageable with said first disk to enable the same to be turned step by step and the number of such steps to be sensed manually.

5. A cutting tool as defined in claim 1 in which said second member is disposed outwardly beyond said first member.

6. A cutting tool as defined in claim 2 in which said body is rotatable and all parts of both of said disks are disposed at radii shorter than that of the cutting tip of said tooth.

7. A cutting tool as defined in claim 2 in which the spline coupling of the disk constituting said second member is accomplished by a projection on such disk extending inwardly along said hole and said second thread and disposed adjacent a generally flat side thereof.

8. A cutting tool as defined in claim 7 in which said projection extends along the thread of said second nut and is journaled in the latter to rotatably support said second member.

* * * * *